(12) United States Patent
Yoon et al.

(10) Patent No.: US 8,739,978 B2
(45) Date of Patent: Jun. 3, 2014

(54) POROUS MEMBRANE AND PREPARATION METHOD THEREOF

(75) Inventors: Joon-Khee Yoon, Seoul (KR); Moo-Seok Lee, Seoul (KR)

(73) Assignee: Kolon Industries Inc., Kwacheon-Si (KR)

( * ) Notice: Subject to any disclaimer, the term of this patent is extended or adjusted under 35 U.S.C. 154(b) by 449 days.

(21) Appl. No.: 13/059,794

(22) PCT Filed: Aug. 17, 2009

(86) PCT No.: PCT/KR2009/004579
§ 371 (c)(1),
(2), (4) Date: Mar. 11, 2011

(87) PCT Pub. No.: WO2010/021474
PCT Pub. Date: Feb. 25, 2010

(65) Prior Publication Data
US 2011/0155659 A1 Jun. 30, 2011

(30) Foreign Application Priority Data
Aug. 20, 2008 (KR) ........................ 10-2008-0081530

(51) Int. Cl.
*B01D 49/00* (2006.01)
*B01D 71/36* (2006.01)
*B01D 39/14* (2006.01)
*B01D 67/00* (2006.01)
*B01D 71/32* (2006.01)
*B01D 69/02* (2006.01)
*D01F 6/00* (2006.01)

(52) U.S. Cl.
USPC ................. 210/500.36; 210/500.23; 264/184; 264/178 R; 264/177.17

(58) Field of Classification Search
CPC ........ B01D 68/08; B01D 69/00; B01D 71/34; B01D 69/02; B01D 71/32; B01D 39/00; B01D 39/14; B01D 71/36; D01F 6/00
USPC ............. 210/500.27, 500.36, 500.41, 500.23, 210/500.42; 264/41, 178 R, 177.16, 177.14, 264/184
See application file for complete search history.

(56) References Cited

U.S. PATENT DOCUMENTS 4,399,035 A * 8/1983 Nohmi et al. ............ 210/500.23
4,882,223 A * 11/1989 Aptel et al. .................. 428/398
(Continued)

FOREIGN PATENT DOCUMENTS

| CN | 1579601 A | 2/2005 |
| KR | 10-2007-0102011 A | 10/2007 |
| KR | 10-2008-0057637 A | 6/2008 |

OTHER PUBLICATIONS

Cha et al., "Preparation of poly (vinylidene fluoride) hollow fiber membranes for microfiltration using modified TIPS process", Journal of Membrane Science, Jan. 14, 2007, vol. 291, pp. 191-198.
(Continued)

*Primary Examiner* — Ana Fortuna
(74) *Attorney, Agent, or Firm* — Birch, Stewart, Kolasch & Birch, LLP

(57) ABSTRACT

Disclosed is a porous membrane with high tensile strength, good elongation at break, and good water permeability, and a method for manufacturing the same. The porous membrane comprises a bead structure including plural spherical crystallites, wherein macro voids isolated from one another with the plural spherical crystallites are formed in an outer surface side of the porous membrane.

13 Claims, 2 Drawing Sheets

(56) References Cited

U.S. PATENT DOCUMENTS

| | | | |
|---|---|---|---|
| 5,340,480 A * | 8/1994 | Kawata et al. | 210/500.23 |
| 7,351,338 B2 * | 4/2008 | Tada et al. | 210/500.23 |
| 7,455,772 B2 * | 11/2008 | Tada et al. | 210/500.36 |
| 2004/0135274 A1 * | 7/2004 | Matsuda et al. | 264/28 |
| 2007/0199891 A1 * | 8/2007 | Mabuchi et al. | 210/500.23 |
| 2009/0297822 A1 * | 12/2009 | Fujimura et al. | 428/314.2 |
| 2011/0147308 A1 * | 6/2011 | Johnston-Hall et al. | 210/650 |
| 2011/0259816 A1 * | 10/2011 | Yokota et al. | 210/500.23 |

OTHER PUBLICATIONS van de Witte et al., "Phase separation processes in polymer solutions in relation to membrane formation", Journal of Membrane Science, Mar. 14, 1996, vol. 117, pp. 1-31.

Chinese Office Action mailed Jan. 3, 2014 for Chinese Application No. 200980132500.8.

* cited by examiner

POROUS MEMBRANE AND PREPARATION METHOD THEREOF

This application claims the benefit of Korean Patent Application No. 10-2008-0081530 filed on Aug. 20, 2008, which is hereby incorporated by reference for all purposes as if fully set forth herein.

BACKGROUND OF THE INVENTION

1. Field of the Invention

The present invention relates to a porous membrane and a method for manufacturing the same, and more particularly, to a porous membrane with high tensile strength, good elongation at break, and good water permeability, and a method for manufacturing the same.

2. Discussion of the Related Art

A separation method using a membrane has lots of advantages over the method based on heating or phase-changing. Among the advantages is high reliability of water treatment since the water purity required can be easily and stably satisfied by adjusting the size of the pores of a membrane. Furthermore, since the separation method using a membrane does not require a heating process, a membrane can be used with microorganism which is useful for separation process but may be adversely affected by heat.

The separation membrane may comprise a flat-type membrane and a hollow fiber membrane. A hollow fiber membrane module performs a separation process by the use of a bundle of hollow fiber membranes. Thus, in consideration of an effective area used for the separation process, the hollow fiber membrane is more advantageous than the flat-type membrane.

Typically, the hollow fiber membrane has been widely used in the field of microfiltration and ultrafiltration for obtaining axenic water, drinking water, super pure water, and so on. Recently, however, application of the separation method using the hollow fiber membrane is being expanded to include wastewater treatment, solid-liquid separation in a septic tank, removal of suspended solid (SS) from industrial wastewater, filtration of river, filtration of industrial water, and filtration of swimming pool water.

The hollow fiber membrane may be classified into a composite membrane which is manufactured by coating a tubular braid woven by polyester or polyamide fiber with a polymer resin film; and a singular membrane which is manufactured only by polymer resin without using a reinforcing member such as a tubular braid.

Since the composite membrane uses the tubular braid as the reinforcing member, the composite membrane has a good mechanical property (strength and elongation). However, the tubular braid is different in material from the polymer resin film coated thereon so that an adhesive strength is weak between the tubular braid and the polymer resin film. Also, if a physical impact, for example, aeration to prevent contamination of the composite membrane, is applied to the composite membrane continuously, the tubular braid and the polymer resin coated thereon may be separated from each other, whereby the quality of permeates may be lowered. Also, due to a thickness of the tubular braid, it is impossible to reduce a total thickness of the composite membrane below a predetermined value, whereby the composite membrane is disadvantageous in consideration of the effective area. For these reasons, there is the recent trend toward the active studies and researches for the singular membrane rather than the composite membrane.

Generally, the singular membrane may be manufactured by NIPS (Non-solvent Induced Phase Separation) or TIPS (Thermally Induced Phase Separation).

In case of the NIPS, the singular membrane may be manufactured by the following steps: preparing a spinning solution by dissolving polymer resin in a good solvent; extruding the prepared spinning solution through a spinneret; and inducing a coagulation of the spinning solution by bringing the extruded spinning solution into contact with a solution including a non-solvent.

Meanwhile, in case of the TIPS, the singular membrane may be manufactured by the following steps: preparing a spinning solution by forcibly dissolving polymer resin in a poor solvent above a phase-separation temperature; extruding the prepared spinning solution through a spinneret; and coagulating the spinning solution by bringing the extruded spinning solution into contact with a cooling solution below the phase-separation temperature.

The TIPS has disadvantageous of fastidious process control, high energy consumption, and high manufacturing cost since the polymer resin has to be forcibly dissolved in the poor solvent at high temperature of about 120~150° C., and the spinning solution has to be maintained at about 120~150° C. temperature until being extruded through the spinneret.

Also, since a porous membrane prepared by the TIPS includes no macro voids and has a bead structure symmetric in a membrane-thickness direction, water permeability and filtration property of the membrane is relatively low although its mechanical strength is relatively high. Also, since the porous membrane has low elongation at break, it might be damaged during an aeration process for preventing fouling.

In the NIPS, since the polymer resin is dissolved in the good solvent for preparing the spinning solution, there is no need to forcibly dissolve the polymer resin by raising the temperature, whereby the NIPS consumes less energy than the TIPS.

However, the singular membrane prepared by the NIPS has no bead structure, wherein the bead structure is made by the TIPS, but has asymmetric sponge structure including the macro voids, whereby a tensile strength of the singular membrane prepared by the NIPS is insufficient. Thus, the singular membrane prepared by the NIPS cannot satisfy the compaction index below 0.5, which is generally required in this technical field. That is, if a predetermined-level pressure is applied to the singular membrane, the singular membrane is seriously shrunk and distorted so that pores included in the singular membrane are stopped, whereby water permeability of the singular membrane is considerably lowered. Also, the singular membrane prepared by the NIPS has a problem of low rejection rate to impurities due to a large nominal pore size.

SUMMARY

Accordingly, the present invention is directed to a porous membrane and a method for manufacturing the same that substantially obviates one or more of the problems due to limitations and disadvantages of the related art.

An aspect of the present invention is to provide a porous membrane with good water permeability, high rejection rate to impurities, and good mechanical strength, which facilitates to stably control a permeate flux.

Another aspect of the present invention is to provide a method for manufacturing a porous membrane with good mechanical strength, which facilitates to control a manufacturing process with easiness, and to minimize energy consumption.

Additional features and aspects of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a porous membrane comprising a bead structure including plural spherical crystallites, wherein macro voids isolated from one another with the plural spherical crystallites are formed in an outer surface side of the porous membrane.

In another aspect of the present invention, there is provided a method for manufacturing a porous membrane comprising: preparing a spinning solution by dissolving polymer resin in a mixture solvent including both poor solvent and good solvent; extruding the spinning solution through a spinneret; and bringing the extruded spinning solution into contact with a coagulation solution including a non-solvent thereby forming a porous structure.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
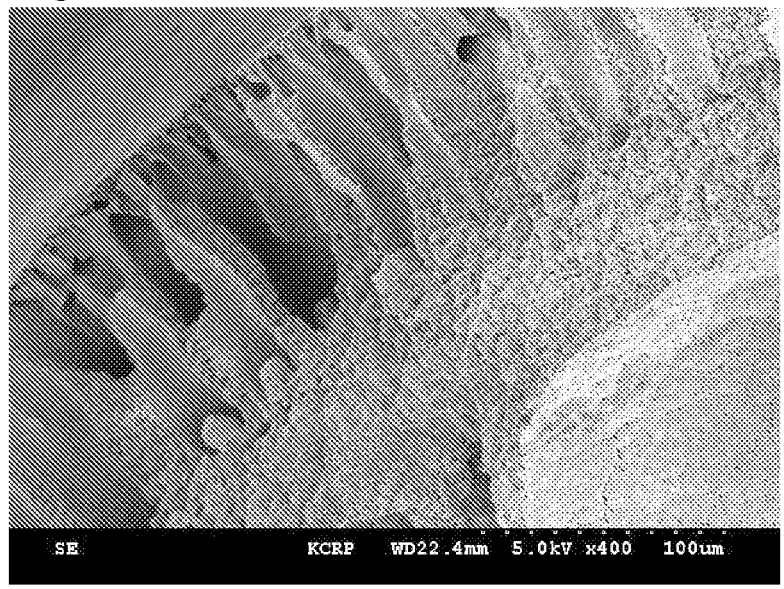
FIGS. 1 to 3 illustrate SEMs (Scanning Electron Micrograph) showing a cross section of a porous membrane magnified 400 times, 1000 times, and 2000 times respectively.

Reference will now be made in detail to an embodiment of the present invention, example of which is illustrated in the accompanying drawings.

Hereinafter, a term 'bead structure' indicates a structure where plural solids of spherical or sphere-like shape are directly connected with one another, or are indirectly connected with one another through stem-shaped solids.

In the present invention, a term 'sponge structure' indicates a three-dimensional net structure of solids. This sponge structure has pores separated from each other by the solids for constructing the net.

In the present invention, a term 'macro void' indicates a pore whose circumcircle has 50 μm diameter.

In the present invention, a term 'water permeability' is defined by an amount (ml) of pure water passing through a unit surface area of membrane for a unit period of time when a unit pressure is applied to the membrane, wherein the 'water permeability' is expressed in units of '$(ml/cm^2) \cdot (min)^{-1} \cdot (kg/cm^2)^{-1}$'.

A term 'compaction index' is defined by $(Lp_{1.0}-Lp_{1.5})/Lp_{1.0}$, wherein '$Lp_{1.0}$' is a water permeability of a porous membrane under 1.0 kg/cm$^2$ pressure, and '$Lp_{1.5}$' is a water permeability of a porous membrane under 1.5 kg/cm$^2$ pressure. The compaction index indicates a distortion level of a membrane according to the increase of pressure. As an elongation at break of the membrane becomes higher, the compaction index of the membrane becomes lower.

Hereinafter, a method for manufacturing a porous membrane according to one embodiment of the present invention will be described in detail as follows.

First, a spinning solution is prepared by dissolving polymer resin in a mixture solvent including both poor solvent and good solvent.

The polymer resin used for preparation of the porous membrane according to the present invention may be polyethersulfone (PES), polysulfone (PS), or polyvinylidene fluoride (PVDF). Especially, PVDF is most generally used owing to resistance to the oxidation atmosphere including ozone used to sterilize water. Also, PVDF is resistant to most of inorganic acid and organic acid solvents, aliphatic and aromatic hydrocarbon solvents, alcohol solvent, and halide solvent.

The poor solvent dissolves the selected polymer resin at a high temperature only when it is heated. That is, the poor solvent is not capable of dissolving the selected polymer resin at an ambient temperature. The poor solvent according to one embodiment of the present invention includes at least one among cyclohexanone, isophorone, gamma-butyrolactone, methyl isoamyl ketone, dimethyl phthalate, propylene glycol methylether, propylene carbonate, diacetone alcohol, and glycerol triacetate.

The good solvent is capable of dissolving the selected polymer resin. When the spinning solution extruded from a spinneret passes through an air gap, the good solvent is capable of being vaporized with easiness, preferably. Also, when the spinning solution is brought into contact with liquid including non-solvent, the good solvent is capable of being discharged from the liquid, preferably. The good solvent according to one embodiment of the present invention includes at least one among N-methyl-2-pyrrolidone; dimethylsulfoxide; dimethylacetamide; dimethylformamide; methylethylketone; acetone; tetrahydrofuran; tetramethylurea; and trimethyl phosphoric acid.

The mixture solvent according to the present invention includes the good solvent as well as the poor solvent. In comparison to the case using only the poor solvent, the mixture solvent including the poor solvent and the good solvent is capable of lowering the dissolution temperature of polymer resin. That is, if only using the poor solvent, the dissolution temperature of polymer resin has to be raised to 120° C.~150° C. However, in case of the present invention, the polymer resin is dissolved in the mixture solvent including the poor solvent and the good solvent, the polymer resin is dissolved sufficiently in the mixture solvent at 100° C.~120° C. In comparison to a typical thermally-induced phase separation (TIPS) method, the method for manufacturing the porous membrane according to the present invention may realize the easy control on the process temperature, and the decrease of power consumption.

According to one embodiment of the present invention, a mass ratio of the good solvent to the poor solvent in the mixture solvent is 0.05 to 4. If the mass ratio of the good solvent is not more than 0.05, the amount of good solvent is too small so that the temperature should be highly raised during the process for manufacturing the spinning solution. Meanwhile, if the mass ratio of the good solvent is more than 4, a liquid-liquid phase inversion exceeds a solid-liquid phase inversion so that the bead structure is not obtained, to thereby lower the strength property of the membrane. In order to make the smaller pore in the manufactured membrane, it is preferable that the mass ratio of the good solvent to the poor solvent be 0.1 to 2.

A concentration of the polymer resin in the spinning solution is appropriately determined in consideration to the desired strength and water permeability of the porous membrane. According to one embodiment of the present invention, the concentration of the polymer resin is 10~50% by weight. If the concentration of the polymer resin is less than 10% by weight, viscosity of the spinning solution is too low so that it is difficult to retain the hollow fiber shape of the porous membrane. Even though the porous membrane is shaped appropriately, the strength of the porous membrane is too low. Meanwhile, if the concentration of the polymer resin is more than 50% by weight, the viscosity of the spinning solution is too high so that it is difficult to carry out the spinning process of the solution. For preparing the spinning solution, the temperature of the polymer resin has to be raised too high. In this case, the prepared porous membrane has the low porosity, whereby the low porosity of the porous membrane causes the deteriorated water permeability.

The spinning solution according to one embodiment of the present invention may include hydrophilic additive or inorganic additive capable of helping the formation of the pores in the porous membrane. The hydrophilic additive may be polyethylene glycol; glycerin; diethyl glycol; triethylene glycol; ethanol; polyvinylpyrrolidone; and water. The inorganic additive may be zinc chloride; or lithium chloride.

The hydrophilic additive or inorganic additive is added into the spinning solution in such a manner that it is to be 5~20% by weight of the entire spinning solution. If the aforementioned additive is less than 5% by weight, it is not helpful to form the pores in the porous membrane. Meanwhile, if the aforementioned additive is more than 20% by weight, the phase separation of the spinning solution is rapidly progressed. In this case, the spinning solution has to be maintained at the high temperature just before the spinning process, and the spun solution may be cut during the spinning process.

The prepared spinning solution is extruded at 10~30 g/min speed from the spinneret. At the same time, the solution including 50~100% by weight of glycerin and 50~0% by weight of pure water is extruded through a slit of the spinneret.

The polymer resin extruded from the spinneret is submerged into a coagulation bath filled with a coagulation solution including non-solvent via an air gap; and is then coagulated. The air gap may be an air layer or inert gas layer, and a length of the air gap may be 0.1 to 15 cm.

The non-solvent which induces the coagulation of the spinning solution in the coagulation bath may include at least one among water, hexane, pentane, benzene, toluene, methanol, ethanol, carbon tetrachloride, and polyethylene glycol. According to one embodiment of the present invention, the temperature of the coagulation solution including the non-solvent is maintained at 2~20° C. If the temperature of the coagulation solution is lower than 2° C., the water permeability of the membrane may be lowered. Meanwhile, if the temperature of the coagulation solution is higher than 20° C., the mechanical strength of the membrane may be lowered.

The spinning solution extruded from the spinneret is coagulated by the solid-liquid phase separation while sequentially passing through the air gap and the coagulation solution, to thereby make the porous structure of hollow fiber membrane. In order to remove the remaining solvent and additive from the porous structure, the porous structure may be cleaned with the pure water.

The porous structure is manufactured by the solid-liquid phase separation, whereby the porous structure has the bead structure on the whole. However, since the good solvent as well as the poor solvent is used for the process of preparing the spinning solution, the coagulation by the liquid-liquid phase separation is progressed to some extent. Especially, the liquid-liquid phase separation strongly happens in the vicinity of the outer surface of the porous structure. Thus, the finally-prepared porous structure according to the present invention is formed in the bead structure including plural spherical crystallites, wherein plural macro voids isolated from one another with the plural spherical crystallites are formed in an outer surface side of the porous membrane. Also, each of the spherical crystallites is formed in shape of microporous spherical crystallite with micro pores formed in its surface.

According to the present invention, the high strength is obtained since the bead structure is formed in the whole area of the porous membrane from its inner surface to its outer surface, and simultaneously, the good water permeability and high elongation at break are realized since the plural macro voids isolated from one another with the plural spherical crystallites are formed in the vicinity of the outer surface of the porous membrane. These properties of good water permeability and high elongation at break in the porous membrane according to the present invention may result from the microporous spherical crystallite included in the porous membrane.

After cleaning the porous structure coagulated in the coagulation bath by the use of pure water, the cleaned porous structure is heat-treated in a bath maintained at about 60~120° C. temperature for 10~30 hours, and is then dried, to thereby obtain the complete porous membrane. If the heat treatment is carried out less than 10 hours, the heat treatment is inefficient so that the finally-prepared porous membrane has the insufficient mechanical strength. Meanwhile, if the heat treatment is carried out more than 30 hours, the membrane structure is too compact so that the water permeability of the finally-prepared porous membrane is lowered.

Selectively, a wetting process may be applied to the porous membrane cleaned with the pure water. If the finally-prepared porous membrane has low initial wetness, the water permeability of the porous membrane may be unsatisfactory in the initial stage of water treatment. According to one embodiment of the present invention, the wetting process of the porous structure is carried out by submerging the porous structure into a wetting solution for 3~5 hours. Selectively, the wetting process of the porous structure may be carried out by spraying the wetting solution onto the porous structure. According to one embodiment of the present invention, the wetting solution includes glycerin. In addition, water as well as glycerin may be included in the wetting solution. In this case, the content of glycerin may be 50~90% by weight of the wetting solution. After completing the wetting process, the porous structure submerged into the wetting solution is put into an oven, to thereby carry out the above heat treatment. In this case, the porous membrane is heat-treated in the oven of 90~120° C. for 1~5 hours. If the heat treatment is carried out less than 1 hour, the heat treatment is inefficient so that the finally-prepared porous membrane has the insufficient mechanical strength. Meanwhile, if the heat treatment is carried out more than 5 hours, the membrane structure is too compact so that the water permeability of the finally-prepared porous membrane is lowered.

Hereinafter, various embodiments and comparative examples will be described as follows to explain the present invention. However, the following embodiments are provided to understand the present invention, that is, the scope of the present invention is not limited to the following embodiments.

Embodiment 1

A spinning solution is prepared by mixing and stirring 20% by weight of polyvinylidene fluoride (PVDF), 40% by weight of gamma-butyrolactone, and 40% by weight of dimethylacetamide (DMAc) under the circumstances of about 110° C. for 24 hours. The prepared spinning solution is extruded through a spinneret. For forming a hollow in a porous membrane, a solution including 80% by weight of glycerin and 20% by weight of pure water is extruded through a slit of the spinneret.

The extruded spinning solution passes through an air gap having 10 cm length, and is then submerged into a coagulation bath filled with a coagulation solution. The coagulation solution is a mixture including 80% by weight of pure water and 20% by weight of glycerin, wherein the coagulation solution is maintained at about 8° C.

After cleaning the porous structure coagulated in the coagulation bath by the use of pure water, the cleaned porous structure is heat-treated in a bath maintained at about 80° C. temperature for 24 hours, and is then dried, to thereby complete the porous membrane.

Figure 2:
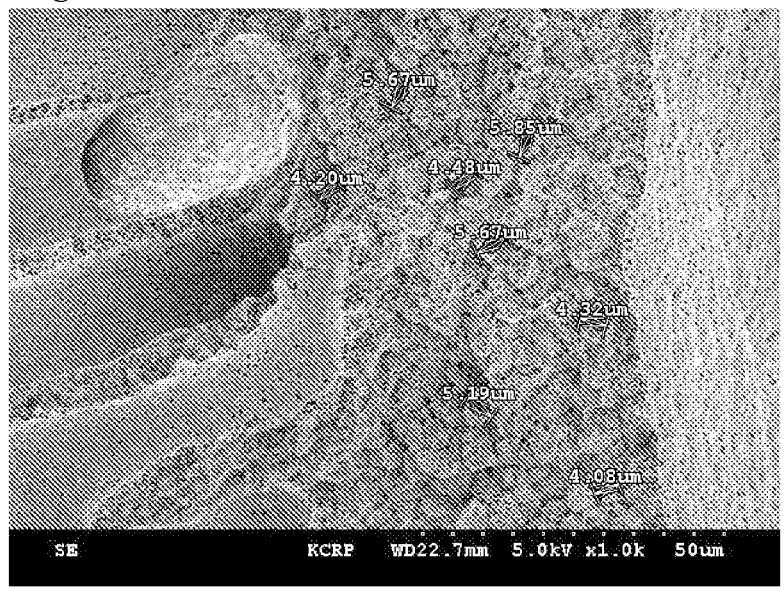
Figure 3:
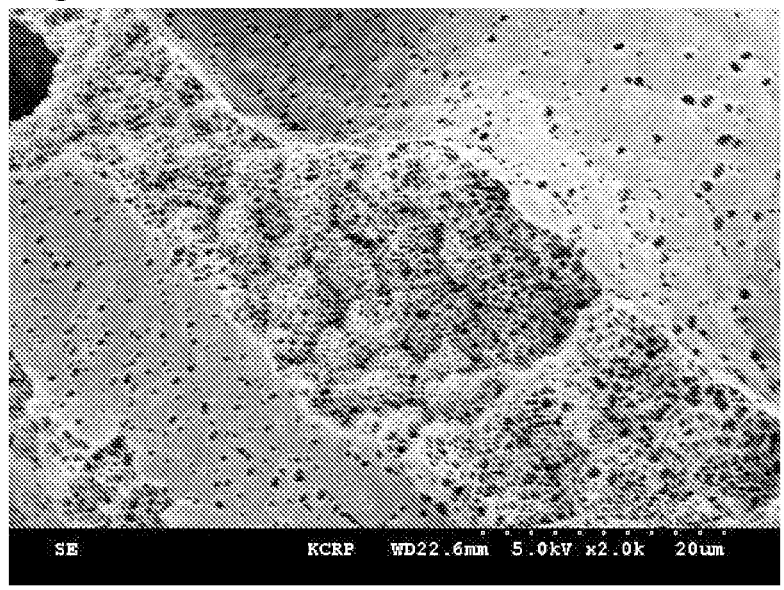

FIGS. 1 to 3 are scanning electron micrographs (SEMs) showing the cross section of the porous membrane prepared according to the above Embodiment 1 of the present invention, which are respectively magnified 400 times, 1000 times, and 2000 times.

As shown in FIGS. 1 to 3, the porous membrane prepared by the above Embodiment 1 has the bead structure including the plural spherical crystallites. In this case, the plural macro voids isolated from one another with the plural spherical crystallites are formed in the outer surface side of the porous structure, and each of the spherical crystallites has microporous spherical crystallite with micro pores in the surface of the spherical crystallite.

COMPARATIVE EXAMPLE 1

Non-Solvent Induced Phase Separation

A spinning solution is prepared by mixing and stirring 15% by weight of polyvinylidene fluoride (PVDF), 80% by weight of dimethylacetamide (DMAc), and 5% by weight of polyvinylpyrrolidone under the circumstances of about 50° C. for 24 hours. The prepared spinning solution is extruded through a spinneret. For forming a hollow in a porous membrane, a solution including 80% by weight of glycerin and 20% by weight of pure water is extruded through a slit of the spinneret.

The extruded spinning solution passes through an air gap having 10 cm length, and is then submerged into a coagulation bath filled with a coagulation solution. The coagulation solution is a mixture including 80% by weight of pure water and 20% by weight of glycerin, wherein the coagulation solution is maintained at about 50° C.

After cleaning the porous structure coagulated in the coagulation bath by the use of pure water, the cleaned porous structure is heat-treated and dried, whereby the porous membrane is prepared.

COMPARATIVE EXAMPLE 2

Thermally Induced Phase Separation

A spinning solution is prepared by mixing and stirring 20% by weight of polyvinylidene fluoride (PVDF) and 80% by weight of gamma-butyrolactone under the circumstances of about 140° C. for 24 hours. The prepared spinning solution is extruded through a spinneret. For forming a hollow in a porous membrane, a solution including 20% by weight of glycerin and 80% by weight of pure water is extruded through a slit of the spinneret.

The extruded spinning solution passes through an air gap having 10 cm length, and is then submerged into a coagulation bath filled with a coagulation solution. The coagulation solution is a mixture including 80% by weight of pure water and 20% by weight of glycerin, wherein the coagulation solution is maintained at about 8° C.

After cleaning the porous structure coagulated in the coagulation bath by the use of pure water, the cleaned porous structure is dried, to thereby complete the porous membrane.

The water permeability (Lp), compaction index, elongation at break, tensile strength, nominal pore size, and rejection rate to a particle with 0.07 μm diameter in the porous membranes finally obtained by the above embodiments and comparative examples may be measured or calculated by the following methods, wherein the measured or calculated results are shown in the following Table 1.

Water Permeability of Porous Membrane

Acryl tube having 10 mm diameter and 170 mm length, and the porous membrane are prepared. After the prepared porous membrane is cut to have 160 mm length, an open end of the porous membrane is sealed by an adhesive. Then, after the porous membrane is inserted into the acryl tube, a space between an end of the acryl tube and the open end of the porous membrane is sealed. Under an ambient temperature of about 25° C., pure water is put into an space between an inner sidewall of the acryl tube and the porous membrane via the other open end of the acryl tube, and a nitrogen pressure of 1.0 kg/cm$^2$ is applied thereto. The water permeability ($Lp_{1.0}$) under the nitrogen pressure of 1.0 kg/cm$^2$ is calculated by the following equation 1.

$$\text{Water permeability}(Lp) = V/(S \cdot t \cdot P) \quad \text{[Equation 1]}$$

wherein 'V' is the amount (ml) of permeates through the porous membrane; 'S' is the surface area (cm$^2$) of the porous membrane; 't' is the permeation time (min); and 'P' is the nitrogen pressure (kg/cm$^2$).

Then, the water permeability ($Lp_{1.5}$) under the nitrogen pressure of 1.5 kg/cm$^2$ is measured in the same method as described above.

Compaction Index

The compaction index of the porous membrane may be calculated by the following equation 2.

$$\text{Compaction index} = (Lp_{1.0} - Lp_{1.5})/Lp_{1.0} \quad \text{[Equation 2]}$$

wherein '$Lp_{1.0}$' is the water permeability measured under the nitrogen pressure of 1.0 kg/cm$^2$; and '$Lp_{1.5}$' is the water permeability measured under the nitrogen pressure of 1.5 kg/cm$^2$.

Elongation at Break

A universal testing machine (Instron 4303) capable of measuring the mechanical properties such as elongation at break and compressive strength is used to measure the elongation at break. After cutting the porous membrane to be 120 mm, 10 mm at each end of the cut porous membrane is held in a grip of a prepared 10N (1 kgf) cell. Under these conditions, the porous membrane is pulled at a speed of 50 mm/min. In this state, an elongation rate (which corresponds to an increased length of the porous membrane with respect to an original length of the porous membrane) is measured just before the porous membrane is broken.

Tensile Strength

A universal testing machine (Instron 4303) capable of measuring the mechanical properties such as elongation at break and compressive strength is used to measure the tensile strength. After cutting the porous membrane to be 120 mm, 10 mm at each end of the cut porous membrane is held in a grip of a prepared 10N (1 kgf) cell. Under these conditions, a breaking strength (Kgf) is measured by pulling the porous membrane at a speed of 50 mm/min.

Nominal Pore Size

Acryl tube having 10 mm diameter and 170 mm length, and the porous membrane are prepared. After the prepared porous membrane is cut to have 160 mm length, an open end of the porous membrane is sealed by an adhesive. Then, after the porous membrane is inserted into the acryl tube, a space between an end of the acryl tube and the open end of the porous membrane is sealed. Thereafter, Galwick™ solution (Porous Materials Inc.) having a surface tension of 15.9 dyne/cm is injected into a space between an inner sidewall of the acryl tube and the porous membrane via the other open end of the acryl tube. After 5 minutes later from the injection, Galwick™ solution (Porous Materials Inc.) is discharged from the acryl tube. Then, the nominal pore size of the porous membrane wet with Galwick™ solution is measured by the use of capillary flow porometer (CFP-1500AE).

Rejection Rate to Particle with 0.07 μm Diameter

Acryl tube having 10 mm diameter and 170 mm length, and the porous membrane are prepared. After the prepared porous membrane is cut to have 160 mm length, an open end of the porous membrane is sealed by an adhesive. After the porous membrane is inserted into the acryl tube, a space between an end of the acryl tube and the open end of the porous membrane is sealed. Then, a substrate containing 0.05 wt % of styrene bead is prepared by putting styrene bead having a mean diameter of 0.07 μm in pure water. The substrate is injected into a space between an inner sidewall of the acryl tube and the porous membrane via the other open end of the acryl tube. Under an ambient temperature of about 25° C., a nitrogen pressure of 0.05 kg/cm² is applied to the porous membrane for 1 minute, to thereby obtain permeates passing through the porous membrane. Then, the concentration of styrene bead in each of the substrate and the permeates is measured by the use of UV[UV-160A](at 460λ), and the rejection rate to the parameter with 0.07 μm diameter is calculated by the following equation 3.

Rejection rate(%)={$(Cs-Cp)/Cs$}×100    [Equation 3]

wherein 'Cs' is the concentration of styrene bead in the substrate; and 'Cp' is the concentration of styrene bead in the permeates.

lower than 0.05. Thus, the porous membrane according to the present invention is less affected than the porous membrane of the comparative example 1 using the non-solvent induced phase separation by the pressure, which shows that the porous membrane according to the present invention provides more stable filtering capability. It can be explained well by the higher tensile strength of the porous membrane according to the embodiment 1 in comparison to the porous membrane of the comparative example 1.

Also, the porous membrane of the embodiment 1 satisfies the general requirement that the water permeability measured under the nitrogen pressure of 1.0 to 1.5 kg/cm² be more than 1.20. Meanwhile, the porous membrane of the comparative example 2 cannot satisfy the required level of water permeability. That is, in comparison to the porous membrane of the comparative example 2 prepared by the thermally induced phase separation, the porous membrane according to the present invention may have the outstandingly higher water permeability.

In brief, the porous membrane of the embodiment 1 has the good water permeability not less than 1.20 under the nitrogen pressure of 1.0 to 1.5 kg/cm², and also enables the stable control of permeate flux owing to the sufficiently-low compaction index.

Meanwhile, even though the porous membrane prepared by the embodiment 1 has the good water permeability, the rejection rate to a particle with 0.07 μm diameter is not less than 99%. However, since the porous membrane prepared by the comparative example 1 has the large nominal pore size of 0.15 μm, the porous membrane prepared by the comparative example 1 shows the good water permeability of 1.50 under the nitrogen pressure of 1.0 kg/cm², but the rejection rate to a particle with 0.07 μm diameter is only 80%. Also, the rejection rate to a particle with 0.07 μm diameter as well as the water permeability in the porous membrane prepared by the comparative example 2 is remarkably lower than that of the porous membrane prepared by the embodiment 1.

Accordingly, the porous membrane according to the present invention can satisfy the compaction index below 5.0, which is required in this field, owing to the good tensile strength. That is, under the high pressure, the pore shape of the porous membrane is not changed so that it is possible to maintain the high water permeability, and to enable the stable control of permeate flux.

Also, the porous membrane of the present invention has the good water permeability and the high rejection rate, to thereby ensure the improved filtering efficiency.

TABLE 1

|  | Water permeability (Lp 1.0) measured under nitrogen pressure of 1.0 kg/cm² | Water permeability (Lp 1.5) measured under nitrogen pressure of 1.5 kg/cm² | Compaction index | Elongation at break (%) | Tensile strength (Kgf) | Nominal pore size (μm) | Rejection rate to particle with 0.07 μm diameter (%) |
|---|---|---|---|---|---|---|---|
| Embodiment 1 | 1.30 | 1.20 | 0.077 | 120 | 0.8 | 0.07 | 99 |
| Comparative example 1 | 1.50 | 0.47 | 0.69 | 150 | 0.3 | 0.15 | 80 |
| Comparative example 2 | 1.00 | 0.97 | 0.03 | 80 | 1.2 | 0.10 | 89 |

As shown in the above Table 1, the porous membrane prepared by the comparative example 1 using the non-solvent induced phase separation cannot satisfy the compaction index below 0.5, which is generally required in this technical field, while the porous membrane prepared by the embodiment 1 shows the compaction index 0.085 which is outstandingly According to the method for manufacturing the porous membrane of the present invention, when the spinning solution is prepared, the mixture solvent including both good solvent and poor solvent is used as the solvent for dissolving the polymer resin. Thus, in comparison to the case of using only the poor solvent, the process temperature is considerably lowered, whereby it enables the easy process control, and the low energy consumption.

What is claimed is:

1. A porous membrane comprising a bead structure including plural spherical crystallites, wherein macro voids isolated from one another with the plural spherical crystallites are formed in an outer surface side of the porous membrane, wherein the porous membrane comprises polyvinylidene fluoride.

2. The porous membrane according to claim 1, wherein each of the plural spherical crystallites is a microporous spherical crystallite with micro pores formed in an outer surface thereof.

3. The porous membrane according to claim 1, wherein water permeability of the porous membrane measured under the nitrogen pressure of 1.0 to 1.5 kg/cm$^2$ is not less than 1.20 (mL/cm$^2$)·(min)$^{-1}$·(kg/cm$^2$)$^{-1}$, and a rejection rate of the porous membrane for a particle with 0.07 μm diameter is not less than 99%.

4. The porous membrane according to claim 1, wherein a compaction index of the porous membrane defined by the following equation is not more than 0.50, $$\text{Compaction index} = (Lp_{1.0} - Lp_{1.5})/Lp_{1.0} \quad \text{[Equation]:}$$

wherein $Lp_{1.0}$ is the water permeability of the porous membrane measured under the nitrogen pressure of 1.0 kg/cm$^2$; and $Lp_{1.5}$ is the water permeability of the porous membrane measured under the nitrogen pressure of 1.5 kg/cm$^2$.

5. A method for manufacturing a porous membrane comprising:
preparing a spinning solution by dissolving polymer resin in a mixture solvent including both poor solvent and good solvent at 100~120° C., wherein the polymer resin is polyvinylidene fluoride, the poor-solvent is gamma-butyrolactone, and the good solvent is dimethylacetamide;
extruding the spinning solution through a spinneret; and
bringing the extruded spinning solution into contact with a coagulation solution including a non-solvent thereby forming a porous structure.

6. The method according to claim 5, wherein a mass ratio of the good solvent to the poor solvent is 0.05 to 4.

7. The method according to claim 5, wherein a mass ratio of the good solvent to the poor solvent is 0.1 to 2.

8. The method according to claim 5, wherein the non-solvent of the coagulation solution includes at least one among water, hexane, pentane, benzene, toluene, methanol, ethanol, carbon tetrachloride, o-dichlorobenzene, and polyethylene glycol.

9. The method according to claim 5, wherein temperature of the coagulation solution is maintained at 2~20° C.

10. The method according to claim 5, further comprising carrying out a heat treatment over the porous structure by putting the porous structure into a bath maintained at 60~120° C. for 10 to 30 hours.

11. The method according to claim 5, further comprising wetting the porous structure.

12. The method according to claim 11, wherein the process of wetting the porous structure is carried out by submerging the porous structure into a wetting solution including glycerin for 3~5 hours.

13. The method according to claim 12, further comprising heating the wetting solution and the porous structure therein at 90~120° C. for 1~5 hours after the wetting process is carried out for 3~5 hours.

* * * * *